United States Patent [19]

Sande et al.

[11] Patent Number: 5,589,030
[45] Date of Patent: Dec. 31, 1996

[54] METHOD FOR PREPARING VANILLIN FROM OLD NEWSPRINT

[75] Inventors: Walter E. Sande; Karl D. Sears, both of Shelton, Wash.

[73] Assignee: Rhone-Poulenc Inc., Cranbury, N.J.

[21] Appl. No.: 350,835

[22] Filed: Dec. 7, 1994

[51] Int. Cl.$^6$ .................................................. D21C 5/02
[52] U.S. Cl. ........................... 162/7; 162/8; 162/16; 162/14
[58] Field of Search ........................... 162/4, 7, 8, 16, 162/14

[56] References Cited

U.S. PATENT DOCUMENTS

| | | | |
|---|---|---|---|
| 4,021,493 | 5/1977 | Major et al. | 260/600 |
| 4,321,328 | 3/1982 | Hoge | 435/161 |
| 4,474,994 | 10/1984 | Makin | 568/438 |
| 4,728,728 | 3/1988 | Lin et al. | 530/501 |

FOREIGN PATENT DOCUMENTS 7408641  6/1974  Netherlands .

OTHER PUBLICATIONS

"Sulfite Treatment of Old Newspaper" Law et al. Abstracts of Papers presented at the 208th Am. Chemical Society National Meeting, Aug. 21–25, 1994, Washington, D.C.

Primary Examiner—Donald E. Czaja
Assistant Examiner—Dean T. Nguyen
Attorney, Agent, or Firm—Katherine L. Stewart; John A. Shedden

[57] ABSTRACT

This invention relates generally to a method for extracting lignosulfonate for the manufacture of vanillin and other specialty chemicals. Specifically, the invention relates to a method for recovering lignosulfonates from newsprint comprising the steps of:

a) converting newsprint to a crumb pulp comprising of from about 20% to about 50% crumb pulp fiber solids by weight on an oven dry basis and the remainder water;

b) cooking the crumb pulp in a medium comprising crumb pulp and cooking acid solution selected from the group consisting of sodium bisulfite, magnesium bisulfite, ammonium bisulfite, calcium bisulfite or mixtures thereof wherein the weight ratio of cooking acid solution to the crumb pulp fiber is from about 3 to about 6 for sufficient time and sufficient temperature and pressure for lignosulfonate removal;

c) separating the crumb pulp fiber from the spent sulfite liquor; and d) recovering the lignosulfonates from the spent sulfite liquor.

9 Claims, No Drawings

METHOD FOR PREPARING VANILLIN FROM OLD NEWSPRINT

This invention relates generally to a method for extracting lignosulfonate for the manufacture of vanillin and other specialty chemicals. Specifically, the invention relates to the extraction of lignosulfonates from old newsprint.

BACKGROUND OF THE INVENTION

Vanillin is a major constituent of vanilla, used as a food flavoring, and is also a precursor to pharmaceutical manufacture. The utilization of raw wood as a source of vanillin can be costly due to timber supply shortages and the potential impact on the environment. In abundant supply and at relatively low cost is old newsprint. Old newsprint is primarily made with high thermomechanical and chemthermomechanical pulp. Therefore, the lignin content is substantial and offers a potential raw material for the manufacture of vanillin.

It is an object of the present invention to provide a method for recovering lignin in quantities equal to or greater than current commercial processes. Further, it is an object to recover material of satisfactory quality for the manufacture of vanillin and other value added lignosulfonate products such as oil well drilling mud additives, textile dye dispersants, and admixtures to improve concrete strength. It is an objective that the lignosulfonate recovered have a high degree of sulfonation and low free-sugar content, the qualities of an excellent starting material for the manufacture of specialty chemicals based on lignosulfonates. The present invention relates to a method which meets these needs.

All percentages and ratios given are on a weight basis unless otherwise indicated.

SUMMARY OF THE INVENTION

A process has been discovered for recovering lignosulfonate and purified cellulose fiber for ethanol production from newsprint comprising the steps of preparing a crumb pulp from the newsprint, cooking the pulp in a cooking acid solution selected from the group consisting of sodium bisulfite, calcium bisulfite, magnesium bisulfite, ammonium bisulfite and mixtures thereof wherein the weight ratio of the cooking acid solution to the crumb pulp fiber is from about 3 to about 6 and recovering the lignin. The lignosulfonate recovered by this process has a high degree of sulfonation and low free-sugar content. This provides excellent characteristics for making vanillin and provides a high yield. The lignosulfonate qualities are excellent for making other lignosulfonate products. The cellulose fiber produced is of excellent quality for conversion into ethanol.

DETAILED DESCRIPTION OF THE INVENTION

The starting material, old newsprint, is available in substantial quantities and at reasonable cost. It contains primarily ground wood which has significant quantities of lignin. It is preferred that the majority of fibers in the newsprint be softwood fibers.

The first step is to convert the newsprint to a crumb pulp. The newsprint can be slurried in water at a low consistency generally from about 1% to about 10%, preferably from about 2% to about 8% and most preferably from about 3% to about 5% newsprint solids on a dry weight basis, to form a uniform suspension. Optionally, the newsprint can be pulped and deinked by conventional methods prior to use. The slurried newspaper slurry is then dewatered to form a crumb pulp having a crumb pulp fiber solids content of from about 20% to about 50%, preferably from about 25% to about 40% and most preferably from about 30% to about 35% on an oven dry basis (OD). The water can typically be removed by centrifuge, by a press or other conventional means.

The crumb pulp is then treated via a cooking process. The crumb pulp is pressure cooked in an autoclave or similar device utilizing sufficient heat and pressure to provide sufficient lignin yield. The time for treatment is generally from about 30 minutes to about 10 hours, preferably from about 1 hour to about 6 hours and most preferably from about 1 hour to about 5 hours at a temperature of from about 125° C. to about 200 ° C., preferably from about 140 ° C. to about 180 ° C. and most preferably from about 150 ° C. to about 175° C. The pressure utilized is generally from about 75 psig to about 140 psig, preferably from about 85 psig to about 120 psig and most preferably from about 90 psig to about 105 psig.

The crumb pulp is added to the autoclave along with a cooking acid solution selected from the group consisting of sodium bisulfite, magnesium bisulfite, ammonium bisulfite, and calcium bisulfite cooking acid. The cooking acid solution can contain free caustic if the pH is more than about 7 and free sulfur dioxide if the pH is less than about 7. Cooking acids are described in S. A. Rydholm, *Pulping Processes*, Intersciences Publishers, New York (1965) which is incorporated herein by reference. Preferably sodium bisulfite cooking acid is utilized and most preferably straight sodium bisulfite cooking acid, i.e., "square acid", is used since it does not contain free caustic or sulfur dioxide. Most preferably other chemicals are not utilized.

The ratio of acid solution to the crumb pulp fiber is from about 3 to about 6, preferably from about 4 to about 5 and most preferably about 4.5 on a weight basis. The concentration of cooking acid, preferably bisulfite, is generally from about 4 to about 50 g/dL total $SO_2$ or other cooking acid, preferably from about 15 to about 35 g/dL total $SO_2$ or other cooking acid and most preferably from about 30 to about 35 g/dL total $SO_2$ or other cooking acid.

Preferably to achieve the maximum recovery of lignosulfinate, the pH of the cooking acid solution is maintained at from about 3 to about 11, preferably from about 3.5 to about 9 and most preferably from about 3.5 to about 5 during the cooking process.

After the cooking process, the crumb pulp fiber is separated from the cooking acid solution now termed "spent sulfite liquor." This can be achieved by a centrifuge, counter current washing, press or other conventional method.

Preferably the recovered pulp fiber is then washed for utilization in ethanol production or some other commercial uses. For ethanol production, enzyme or acid hydrolysis can be used to convert the cellulose fiber to ethanol by methods known in the art.

The lignosulfonate is then recovered from the spent sulfite liquor via conventional means. Preferably the spent sulfite liquors are subjected to ultrafiltration or another ash removal process known in the art prior to utilization in vanillin production. Typically, the spent sulfite liquor is evaporated, preferably to a greater than about 45% solids oven dry basis, before processing for vanillin.

A preferred method of producing vanillin comprises ultrafiltration of the spent sulfite liquor; evaporating to a greater than about 45% oven dry basis (preferably greater than about 30%); and cooking with caustic and air at about 150 psig, about 165° C. for about 45 minutes to about 1 hour. A number of conventional processes can be used to recover and purify vanillin such as described in the references below.

Bisulfite cooking processes are described in S. A. Rydholm, *Pulping Processes*, Intersciences Publishers, New York (1965) which is incorporated herein by reference. Lignosulfonate occurrence, formation, structures and reactions are described in K. V. Sarkanen and C. H. Ludwig, Editors, *Lignins—Occurrences, Formations, Structure and Reactions*, Wiley Interscience, New York (1971) which is incorporated herein by reference. Vanillin manufacture from lignosulfonate is described in G. H. Tomlinson and H. Hibbert, American Chemical Society, 58, p345 (1936) and J. R. Salvensen, et al. U.S. Pat. No. 2,434,26 (1948) which are incorporated herein by reference.

EXAMPLES

Experimental Approach

Newsprint stock on end rolls are obtained from a local newspaper publisher. This is clean newsprint. Most of the work is done with this material to avoid having to deink prior to cooking. However, some old Seattle Times newspapers are deinked by slurring the paper in hot water to confirm optimum conditions with deinked pulp The newsprint is slurried at low consistency to obtain a uniform suspension. It is then dewatered into crumb pulp using a centrifuge to about 30% solids, oven dry basis (O.D.). About one kg of crumb pulp is added to a stirred one-gallon autoclave. About 1200 mL of cooking liquor of the proper concentration is added, the autoclave is capped, and the cook conducted by adding steam to the jacket. After the specified time at temperature, the autoclave is cooled by adding water to the jacket, the pulp and spent cooking liquor are removed and separated by centrifugation. The pulp is washed and both the pulp and liquor are weighed for yield calculations. The fiber and liquor are analyzed by TAPPI Standard Methods.

For vanillin studies, the spent sulfite liquor from several cooks at optimum conditions are collected and vacuum evaporated to about 50% O.D. solids. Caustic is added in the ratio of about 0.52 g NaOH/g spent sulfite liquor solids. Final solids content is about 14.2%. The solution is cooked in a five-gallon batch autoclave for about one hour. Air is added and the contents are stirred continuously. Samples are withdrawn every five minutes to determine the peak vanillin content since vanillin can be over-oxidized. Liquid chromatography is used to measure vanillin content. Reactor conditions are about 150 psig and from about 165 to about 166 degrees C. A control cook using standard spent sulfite liquor from the full scale pulp mill is used as a comparison.

Discussion of Results

An analysis of the fiber used in the majority of the cooks is given in Table I. It contains a substantial amount of CTMP (about 80%) with the remainder being fully bleached Kraft fibers. The majority of the fibers are softwood (about 96%). This indicates that the lignin should be a good source of lignosulfonate for vanillin since hardwood lignin provides a mixture of syringaldehyde and vanillin. Syringaldehyde does not have the established markets and attractive price that vanillin enjoys.

TABLE I

| Recycled Newsprint Stock (no ink)[a] |
|---|
| Fiber Makeup |
| 16% Softwood Bleached Kraft-Western Hemlock, Spruce, White Fir |
| 80%-CTMP-Douglas Fir, Western Fir |
| 4%-Hardwood Bleached Kraft | a — End rolls obtained from Shelton-Mason County Journal, Washington, USA

TABLE II

Newsprint Cooks[a] at 165° C. (2 hr.)[b] With Different Sodium Bisulfite Cooking Acid Strengths and Added Caustic Levels

| NaHSO$_3$, g/dL Total SO$_2$ | Adjusted pH | g | NaLS Yield, % | NaLS in SSL, %[c] | Residual Total SO$_2$, g/dL in SSL |
|---|---|---|---|---|---|
| 13.7 (1700 mL) | 9.0[d] | 60.7 | 21.7 | 12.0 | 7.5 |
| 33.4 (1200 mL) | 5.0[e] | 69.0 | 24.6 | 8.2 | 14.7 |
| 33.4 (1200 mL) | 4.0[f] | 75.4 | 26.9 | 9.9 | 14.1 |
| 16.7 (1200 mL) | 4.1[g] | 65.4 | 23.3 | 17.5 | 7.4 |
| 8.4 (1200 mL) | 4.0[h] | 35.6 | 12.7 | 18.6 | 3.8 |
| 4.2 (1200 mL) | 4.2[i] | 31.7 | 11.3 | 25.5 | 1.4 |

[a]Using 280 g O.D. of newsprint fibers and 536 g water (factor of 0.343).
[b]About 20 minutes to temperature. Analysis of unconcentrated liquor.
[c]Based on O.D. solids. Analysis of unconcentrated liquor.
[d]Required 590 g of 25% NaOH added to 1700 mL of NaHSO$_3$.
[e]Required 100 g of 25% NaOH added to 1200 mL of NaHSO$_3$.
[f]Required 12 g of 25% NaOH added to 1200 mL of NaHSO$_3$.
[g]Required 4 g of 25% NaOH added to 1200 mL of NaHSO$_3$.
[h]Required 2 g of 25% NaOH added to 1200 mL of NaHSO$_3$.
[i]Required 1 g of 25% NaOH added to 1200 mL of NaHSO$_3$.

Initial cooks are conducted by varying the pH and amount of cooking acid. The objective is to estimate the conditions at which the maximum amount of lignosulfonate can be recovered. The results are summarized in Table II. The preferred optimum yield, about 26.9% sodium lignosulfonate (NaLS), is achieved at the lowest pH and the highest cooking liquor strength.

Based on the initial results, additional cooks are conducted by using straight sodium bisulfite liquor; this is termed "square acid" since it contains no free caustic or sulfur dioxide. The concentration used is about 5.6 g/dl total So$_2$. The temperature and cook time are increased to both improve lignin recovery and provide a satisfactory yield of pulp. The results are summarized in Table III. The NaLS yield results indicate that for the preferred yields the cook should not be allowed to go flat, but to maintain a low pH throughout the cook. Therefore, in the next series, cooking liquor bisulfite concentration is increased to above about 7 g/dL total So$_2$. The results are outlined in Table IV. All the yields are acceptable except for two cooks where liquor leaked from the digester resulting in too little cooking acid to maintain a low pH. The results in Table V show that there are no benefits in going to higher cooking acid strengths. Table VI summarizes two cooks with deinked newsprint that give high lignin yields.

The spent sulfite liquors (SSL) from several cooks are combined and vacuum evaporated to provide material for vanillin yield studies. In Table VII, the analyses of the ONP generated SSL is compared to typical SSL from the full scale pulp mill operation that is used to manufacture vanillin commercially. In Table VIII, the yield from a vanillin cook from the ONP SSL listed in Table VII is compared to a control cook from pulp mill SSL. Based on total solids, the ONP SSL gives about 50% of the yield from the pulp rail SSL. This is due to the higher degree of sulfonation. This typically can provide more vanillin sites on the lignin molecule. Second, added caustic is consumed by wood sugars in the vanillin reactor se less is available to produce vanillin. The ONP SSL has an extremely low sugar content. Therefore, it would be practical to conduct ultrafiltration of the ONP SSL prior to vanillin production. The ash would be easily removed and the subsequent vanillin yields would be high on the volumetric basis.

While the process provides and alternative raw material for the manufacture of vanillin and other lignosulfonate products, the fiber quality does not meet the requirements of the paper mills. The fiber strength does not meet the current market demands. As shown in Table III to VI, fiber yields are satisfactory but K No.'s are high and chlorited intrinsic viscosities (an indication of strength) and brightness are low. Paper properties are measured on a composite and compared to the ONP before it is cooked. The results are presented in Table IX. In summary, the fiber obtained from bisulfite cooking ONP is not suitable as a major furnish for most currently known papermaking applications. However, the fiber is suitable for ethanol production or ciould be added as a component of some paper grades, i.e. as a filler.

TABLE VII

Analyses[a] of SSL from ONP Compared to Pulp Mill SSL

| | ONP SSL | Pulp Mill SSL |
|---|---|---|
| Solids, % (OD) | 44.8 | 50 |
| Sodium, % | 12.4 | 5.1 |
| Sulfur (as S), % | 12.2 | 5.7 |
| Sulfite (as S), % | 4.8 | 0.2 |
| Sulfate (as S), % | 0.85 | 0.6 |
| Organically Bound S, % | 6.55 | 4.9 |
| Ash, % | 35.3 | 13 |
| Total Free Sugars, % | 0 | 22.3 |
| Total Hydrolyzable Sugars, % | 5.6 | 22.8 |
| Sodium lignosulfonate, % | 26.8 | 62.2 | a — Values based on OD solids

TABLE VIII

Vanillin Yield from ONP SSL Compared to Pulp Mill SSL

| | Vanillin, % of SSL Solids | Vanillin % of NaLS |
|---|---|---|
| ONP SSL | 1.66 | 6.18 |
| Pulp Mill SSL | 3.16 | 5.08 |

TABLE IX

Paper Properties of Bisulfite Cooked ONP

| Sample: | ONP before Cooking: | ONP after Cooking: |
|---|---|---|
| Freeness, mL | 65 | 25 |
| Density, g/cc | 0.48 | 0.81 |
| Opacity % | 96 | 89.4 |
| Air Resistance, s/100 mL | 82 | 1675 |
| Tear Index, mN m$^2$/g | 6 | 1.5 |
| Burst Index, kPa m$^2$/g | 1.9 | 1.4 |
| Breaking Length, km | 4 | 4.1 |
| WAFL, mm | 1.35 | 0.94 |
| Fines, wt % | 8.8 | 5.6 |

The preferred embodiments have been described in detail above for the purpose of illustration only. It will be apparent to a practitioner of ordinary skill in the art that various modifications could be made without departing from the spirit and scope of the invention.

Conclusions

A unique application of old newsprint has been demonstrated. It can be used to supply raw material for the manufacture of vanillin, a relatively high priced chemical which is used as a food flavoring and precursor to pharmaceutical manufacture. The lignosulfonate recovered has the advantage of a high degree of sulfonation and low free-sugar content. Both these characteristics should provide an excellent starting raw material for the manufacture of specialty chemicals based on lignosulfonates. Implied is lignosulfonate suitable for dispersants because it provides good vanillin yield and cellulose purification for ethanol production. A simple ash removal process using ultrafiltration would probably be required as part of a commercial process. Initial results indicate the fiber has limited utility in papermaking. However, this process should be an excellent pretreatment for preparing wastepaper for conversion into ethanol while recovering the lignin in a valuable chemical form. It would remove lignin and other contaminants from the waste fiber and provide a highly accessible fiber for ethanol production. For a reactor, either a batch or tubular screw Pandia might be used. Sodium bisulfite could be purchased or manufactured on site. After cooking, the lignin would be recovered by countercurrent washing as now practiced in the pulp and paper industry. The recovered lignin would probably need to be evaporated prior to being used to manufacture vanillin or other high value added lignosulfonate-based products. An ideal location for such a plant would be adjacent to an existing sulfite pulp mill.

TABLE III

Newsprint Cooks at 170–174° C. (3 hr.)[a] with NaHSO$_3$ Cooking Liquor

| pH | | Amount of NaLS in SSL | | Residual | Pulp | Pulp Analyses | | |
|---|---|---|---|---|---|---|---|---|
| Before | After | NaLS g | NaLS Yield, % | Total SO$_2$, in SSL, %[c] | Yield, g/dL in SSL % | K No. | Chlorited I.V. | ISO Brightness |

A. 280 g. O.D. Newsprint Fibers, 536 g Water (factor = 0.343). 1200 mL of NaHSO$_3$ Cooking Liquor (5.57 g/dL Total SO$_2$)[b]

| 3.7 | 3.9 | 68.2 | 24.3 | 39.1 | 1.42 | 63.6 | 32.3 | — | 37.5 (56) |
| 3.7 | 3.9 | 64.9 | 23.2 | 36.3 | 1.42 | 66.1 | 36.9 | 1.9 | — |
| 3.7 | 5.4 | 44.7 | 16.0 | 27.3 | 1.18 | 78.2 | — | — | — |

TABLE III-continued

Newsprint Cooks at 170–174° C. (3 hr.)[a] with NaHSO$_3$ Cooking Liquor

| pH Before | pH After | Amount of NaLS in SSL NaLS g | Amount of NaLS in SSL Yield, % | NaLS in SSL, %[c] | Residual Total SO$_2$, g/dL in SSL | Pulp Yield, % | Pulp Analyses K No. | Chlorited I.V. | ISO Brightness |
|---|---|---|---|---|---|---|---|---|---|
| \multicolumn{10}{l}{B. 280 g O.D. Newsprint Fibers, 558 g Water (factor = 3.334). 1178 mL of NaHSO$_3$ Cooking Liquor (5.87 g/dL Total SO$_2$)[e]} |
| 3.7 | 3.75 | 62.9 | 22.1 | 34.6 | — | 66.3 | — | — | — |
| 3.7[f] | 5.6 | 49.5 | 17.7 | 30.1 | — | 75.0 | — | — | — |
| 3.7[f] | 4.5 | 51.8 | 18.5 | 30.5 | — | 70.4 | — | — | — |
| 3.7[f] | 3.7 | 69.0 | 24.6 | 37.4 | — | 64.4 | — | — | — |
| 3.7 | 5.1 | 47.1 | 16.8 | 28.6 | 1.32 | 74.4 | — | — | — |

[a] About 25 minutes to temperature.
[b] Liquor:fiber = 4.51; liquid:fiber = 6.43; consistency = 13.4%.
[c] Based on O.D. solids. Analysis of unconcentrated liquors.
[d] ISO Brightness of newsprint fiber before pulping.
[e] Liquor:fiber = 4.45; liquid:fiber = 6.44; consistency = 13.4%.
[f] Some liquor leakage initially in cook.

TABLE IV

Newsprint Cooks at 170–174° C. (3 hr.)[a] with NaHSO$_3$ Cooking Liquors

| pH Before | pH After | Amount of NaLS in SSL NaLS g | Amount of NaLS in SSL Yield, % | NaLS in SSL, %[c] | Residual Total SO$_2$, g/dL in SSL | Pulp Yield, % | Pulp Analyses K No. | Chlorited I.V. | ISO Brightness |
|---|---|---|---|---|---|---|---|---|---|
| \multicolumn{10}{l}{A. 280 g. O.D. Newsprint Fibers, 558 g Water (factor = 0.334). 1178 mL of NaHSO$_3$ Cooking Liquor (7.09 g/dL Total SO$_2$)[b]} |
| 3.7 | 3.75 | 74.7 | 26.7 | 35.8 | 1.37 | 61.4 | 36.6 | 1.39 | — |
| \multicolumn{10}{l}{B. 280 g O.D. Newsprint Fibers, 623 g Water (factor = 3.310). 1115 mL of NaHSO$_3$ Cooking Liquor (7.49 g/dL Total SO$_2$)[d]} |
| 3.7 | 4.4 | 59.2 | 21.1 | 29.6 | — | 68.9 | — | — | — |
| 3.7[e] | 5.2 | 50.1 | 17.9 | 25.4 | — | 72.1 | — | — | — |
| 3.7[e] | 5.4 | 49.5 | 17.7 | 26.2 | — | 72.1 | — | — | — |
| 3.7 | 4.3 | 62.7 | 22.4 | 31.9 | 1.71 | 68.2 | — | — | — |
| 3.7 | 4.7 | 68.7 | 24.5 | 34.4 | 1.67 | 65.2 | 35.6 | 1.81 | 43 (56)[f] |

[a] About 25 minutes to temperature.
[b] Liquor:fiber = 4.50; liquid:fiber = 6.50; consistency = 13.3%.
[c] Based on O.D. solids. Analysis of unconcentrated liquors.
[d] Liquor:fiber = 4.29; liquid:fiber = 6.51; consistency = 13.3%.
[e] Experienced considerable leakage initially.
[f] ISO Brightness of newsprint fiber before cooking.

TABLE V

Newsprint Cooks at 170–174° C. (3 hr.)[a]; 280 g O.D. Newsprint Fiber, 623 g. Water (factor = 0.310). 1115 mL of NaHSO$_3$ Cooking Liquor (8.99 g/dL Total SO$_2$)[b]

| pH Before | pH After | Amount of NaLS in SSL NaLS g | Amount of NaLS in SSL Yield, % | NaLS in SSL, %[c] | Residual Total SO$_2$, g/dL in SSL | Pulp Yield, % | Pulp Analyses K No. | Chlorited I.V. | ISO Brightness |
|---|---|---|---|---|---|---|---|---|---|
| 3.7 | 5.0 | 52.6 | 18.8 | 25.9 | 2.92 | 66.4 | 38.3 | 1.9 | 43 (56)[d] |
| 3.7 | 5.0 | 66.1 | 23.6 | 29.9 | 2.38 | — | 36.5 | 1.7 | 43 (56)[d] |

[a] About 25 minutes to temperature.
[b] Liquor:fiber = 4.36; liquid:fiber = 6.58; consistency = 13.2%.
[c] Based on O.D. solids. Analysis of unconcentrated liquors.
[d] ISO Brightness of newsprint fiber before cooking.

TABLE VI

Results on Deinked Newsprint[a] Cook at 170–174° C. (3 hr.)[b] with NaHSO$_3$ Liquor (6.05–6.13 g/dL)

| pH | | NaLS in SSL | | Residual | Pulp | Pulp Analyses | | |
|---|---|---|---|---|---|---|---|---|
| Before | After | NaLS Yield, % | NaLS in SSL, %[c] | Total SO$_2$, g/dL in SSL | Yield, % | K No. | Chlorited I.V. | ISO Brightness |
| 3.5[d] | 3.7 | 26.8 | 36.5 | 1.73 | 63.9 | — | — | — |
| 3.5[e] | 3.7 | 24.8 | 34.8 | 1.87 | 65.1 | 33.7 | 1.72 | 20.9 |

[a] Seattle Times newspaper, deinked and repulped by stirring with water.
[b] About 25 minutes to temperature.
[c] Based on O.D. solids. Analysis of unconcentrated liquors.
[d] Pulped 251.5 g of O.D. fiber, 312.5 g water (factor = 0.439) with 1240 mL of sodium bisulfite cooking liquor (6.05 g/dL total SO$_2$). Liquor:fiber = 5.23; liquid:fiber = 6.50; consistency = 13.3%.
[e] Pulped 280 g of O.D. fiber, 376 g water (factor = 0.427) with 1362 mL of sodium bisulfite cooking liquor (6.13 g/dL total SO$_2$). Liquor:fiber = 5.17; liquid:fiber = 6.51; consistency = 13.3%.

What is claimed is:

1. A method for preparing vanillin from old newsprint comprising the steps of:
    a) converting old newsprint to a crumb pulp comprising of from about 20% to about 50% crumb pulp fiber solids by weight on an oven dry basis and the remainder water;
    b) cooking the crumb pulp in a medium comprising crumb pulp and cooking acid solution selected from the group consisting of sodium bisulfite, magnesium bisulfite, ammonium bisulfite, calcium bisulfite or mixtures thereof wherein the weight ratio of cooking acid solution to the crumb pulp fiber is from about 3 to about 6 for sufficient time and at sufficient temperature and pressure to form a spent sulfite liquor containing lignosulfonates;
    c) separating the cooked crumb pulp fiber from the spent sulfite liquor;
    d) removing the lignosulfonates from the spent sulfite liquor; and
    e) preparing vanillin from the removed lignosulfonates.

2. A method according to claim 1 wherein the pH of the cooking acid solution is in the range of from about 3 to about 11 during cooking.

3. A method according to claim 1, wherein the removing of the lignosulfonates from the spent sulfite liquor is carried out by ultrafiltration of the spent sulfite liquor.

4. A method according to claim 1 wherein the time for cooking is from about 30 minutes to about 10 hours, the temperature for cooking is from about 125° C. to about 200° C. and the pressure for cooking is from about 75 psig to about 140 psig.

5. A method according to claim 4 wherein the cooking acid solution is sodium bisulfite.

6. A method for preparing vanillin from old Newsprint comprising the steps of:
    a) converting old newsprint to a crumb pulp;
    b) cooking the crumb pulp in a medium comprising crumb pulp and cooking acid solution selected from the group consisting of sodium bisulfite, magnesium bisulfite, ammonium bisulfite, calcium bisulfite or mixtures thereof wherein the weight ratio of cooking acid solution to the crumb pulp fiber is from about 3 to about 6 and the pH of the cooking acid solution is from about 3 to about 11, for from about 30 minutes to about 10 hours at a temperature of from about 125° C. to about 200° C. and a pressure of about 75 psig to about 140 psig to form a spent sulfite liquor containing lignosulfonate;
    c) separating the cooked crumb pulp fiber from the spent sulfite liquor;
    d) removing the lignosulfonates from the spent sulfite liquor; and
    e) preparing vanillin from the removed lignosulfonates.

7. A method according to claim 6 wherein the weight ratio of cooking acid solution to the crumb pulp fiber is from about 4 to about 5.

8. A method according to claim 7, wherein the removing of the lignosulfonates from the spent sulfite liquor is carried out by ultrafiltration of the spent sulfite liquor.

9. A method according to claim 6 wherein the cooking acid solution is sodium bisulfite.

* * * * *